(12) United States Patent
Andreason

(10) Patent No.: US 8,170,472 B2
(45) Date of Patent: *May 1, 2012

(54) ARRANGEMENT AND A METHOD IN A TELEPHONY SYSTEM

(75) Inventor: Tomas Andreason, Tyreso (SE)

(73) Assignee: Telefonaktiebolaget LM Ericsson (pul), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 12/805,383

(22) Filed: Jul. 28, 2010

(65) Prior Publication Data
US 2010/0297945 A1 Nov. 25, 2010

Related U.S. Application Data

(63) Continuation of application No. 09/898,480, filed on Jul. 5, 2001, now Pat. No. 7,792,484.

(51) Int. Cl.
*H04B 7/15* (2006.01)

(52) U.S. Cl. ............ 455/11.1; 455/74.1; 455/41.2; 379/207.08

(58) Field of Classification Search .......... 455/11.1, 455/74, 41.2, 401, 414.1, 415, 417, 426.2, 455/435.1, 567; 379/188, 212.01, 207.08
See application file for complete search history.

(56) References Cited

U.S. PATENT DOCUMENTS

| | | | |
|---|---|---|---|
| 5,390,233 A | 2/1995 | Jensen et al. | |
| 5,726,984 A | 3/1998 | Kubler et al. | |
| 6,014,377 A | 1/2000 | Gillespie | |
| 6,014,560 A | 1/2000 | Kramer | |
| 6,118,993 A | 9/2000 | Patel | |
| 6,192,231 B1 | 2/2001 | Chapman et al. | |
| 6,223,029 B1 | 4/2001 | Stenman et al. | |
| 6,591,114 B1 | 7/2003 | Inbody | |
| 6,604,140 B1 | 8/2003 | Beck et al. | |
| 6,633,759 B1 | 10/2003 | Kobayashi | |
| 6,650,894 B1 | 11/2003 | Berstis et al. | |
| 6,909,878 B2 | 6/2005 | Haller et al. | |

(Continued)

FOREIGN PATENT DOCUMENTS
DE 195 39 507 5/1997
(Continued)

OTHER PUBLICATIONS

U.S. Appl. No. 09/898,480, filed Jul. 5, 2001; Inventor: Andreason.
(Continued)

*Primary Examiner* — Shaima Q Aminzay
(74) *Attorney, Agent, or Firm* — Nixon & Vanderhye P.C.

(57) ABSTRACT

A mobile telephone is easy to carry around but has a small keypad and a small display. A normal deskphone has a big keypad and display and has a convenient handset, but is stationary. A stationary communications terminal is described which is connected to a mobile telephony network via a mobile telephone. The mobile and the stationary terminal have each a BLUETOOTH radio transceiver and are interconnected via a BLUETOOTH link. The stationary communications terminal lacks identity in the mobile network. A subscriber, owning the mobile, can call on the stationary communications terminal and can move to another network having another stationary terminal, on which he can make a call. Another subscriber with a mobile can call on the communications stationary terminal. To prevent misuse the subscribers take an authentication code for his respective mobile on the stationary terminal, and the authentication can be made valid for a predetermined period by taking a service code.

18 Claims, 9 Drawing Sheets

U.S. PATENT DOCUMENTS

| | | |
|---|---|---|
| 6,947,759 B1 | 9/2005 | Yamaguchi et al. |
| 6,993,357 B1 | 1/2006 | Ito et al. |
| 6,999,769 B1 | 2/2006 | Henon |
| 7,016,648 B2 | 3/2006 | Haller et al. |
| 7,020,467 B2 | 3/2006 | Tada |
| 2001/0006885 A1 | 7/2001 | Rek |
| 2002/0072390 A1 | 6/2002 | Uchiyama |
| 2002/0147009 A1 | 10/2002 | Kocheisen |
| 2003/0008612 A1 | 1/2003 | Andreason |
| 2003/0162544 A1 | 8/2003 | Austin et al. |
| 2004/0053639 A1 | 3/2004 | Petite et al. |
| 2005/0101261 A1 | 5/2005 | Weinzweig et al. |
| 2005/0197061 A1 | 9/2005 | Hundal |
| 2006/0057961 A1 | 3/2006 | Dietz et al. |

FOREIGN PATENT DOCUMENTS

| | | |
|---|---|---|
| EP | 0 569 314 | 11/1993 |
| EP | 0 695 102 | 1/1996 |
| EP | 0 717 578 A2 | 6/1996 |
| EP | 0 930 766 A2 | 7/1999 |
| WO | WO 90/14729 | 11/1990 |
| WO | WO 96/32824 | 10/1996 |
| WO | WO 98/47300 | 10/1998 |

OTHER PUBLICATIONS

Office Action mailed Apr. 5, 2004 in co-pending U.S. Appl. No. 09/898,480.

Office Action mailed Apr. 8, 2005 in co-pending U.S. Appl. No. 09/898,480.

Office Action mailed Jul. 29, 2005 in co-pending U.S. Appl. No. 09/898,480.

Office Action mailed Mar. 10, 2006 in co-pending U.S. Appl. No. 09/898,480.

Office Action mailed Nov. 22, 2006 in co-pending U.S. Appl. No. 09/898,480.

Office Action mailed Aug. 6, 2007 in co-pending U.S. Appl. No. 09/898,480.

Office Action mailed Mar. 19, 2008 in co-pending U.S. Appl. No. 09/898,480.

Bluetooth Specification Version 1.0. B, "Headset Profile," Dec. 1, 1999, pp. 218-229.

Bluetooth Specification Version 1.0 B, "Cordless Telephony Profile," Dec. 1, 1999, pp. 97-99 & 105.

Bluetooth Specification Version 1.0 B, "Profiles of the Bluetooth System," Dec. 1, 1999, pp. 3-11.

Bluetooth Specification Version 1.0 B, "Headset Profile," Dec. 1, 1999, pp. 191-217.

Bluetooth, J. Haartsen, "The Universal Radio Interface for ad hoc, Wireless Connectivity," Ericsson Review, No. 3 pp. 110-117, 1998, URL:http://www.ericsson.com/about/publications/review/1998_03/files/1998031.pdf.

Michael T. Camp, "Development of the Bluetooth Version 1.0 Specification" http://ieeexplore.ieee.org/xpla/abs_all.jsp?arnumber=916530 (Link to publication information) http://ieeexplore.ieee.org/ie15/7323/19797/00916530.pdf (Link to publication) Date: Apr. 10, 2000, 1-7 pages.

ARRANGEMENT AND A METHOD IN A TELEPHONY SYSTEM

This application is a continuation application of U.S. Ser. No. 09/898,480, filed on Jul. 5, 2001, now U.S. Pat. No. 7,792,484, the entire content of which is hereby incorporated by reference in this application.

TECHNICAL FIELD

The technical field relates to an arrangement and a method in a telephony system in which a stationary telephony terminal is connected to a mobile radio telephony network via a mobile radio telephone, and to the stationary telephony terminal.

BACKGROUND

A person communicating via a telecommunications network often uses a conventional stationary deskphone, which is convenient to use as it has a big keypad and a big display. The person can use stationary deskphones when moving between different locations, but then subscriptions, rights, identities etc belonging to other persons are utilized. Instead, when moving the person can use a mobile telephone, which is small and is easy to carry around. The mobile telephone on the other hand has a small keypad that can be a bit difficult to use and has a tiny display that can be hard to view. The sound quality and the volume are not always excellent for a mobile telephone but are nearly always so for a deskphone. The handset for the deskphone is often regarded as more convenient to hold than the small mobile telephone. This leads to a situation where people have both a mobile telephone to carry around and a stationary deskphone in the office. The person has separate accesses although one would have been enough and the person also must have multiple sets of user data in the telephony system. Multiple directory numbers can be confusing for other persons. Also, the deskphone still requires the person to be tied to a particular telephone line, and if the person moves permanently the user data have to be changed.

The European patent application EP 0 930 766 A2 discloses a system for radio communication between a wireless LAN and a PBX. The wireless LAN has remote devices, which have radio access to the PBX and can use its different features. In an embodiment the remote device is a cash register which is cable connected to a mobile phone. The latter is in turn radio connected to the PBX. In an alternative the phone is a wireless phone which communicates with the cash register by digital radio communication.

In the U.S. Pat. No. 5,726,984 is disclosed a communication system including a LAN, which has radio access points. Computing devices are in radio contact with the access points and peripheral devices, such as printers, are radio connected to the computing devices. The patent also discloses stationary telephones which are wire connected to radio access devices. The latter are in turn radio connected to the LAN, which is a wired backbone LAN.

SUMMARY

A main problem is that a mobile radio telephone, which is easy to carry around can be a bit inconvenient to handle, while a more convenient desk telephone is stationary. This leads to a situation where people have both a stationary desk telephone and a mobile radio telephone, which requires multiple sets of user data in the telephony system for one person and also requires the person to have multiple directory numbers.

A further problem is that if the person moves permanently the person's user data in the telephony system have to be changed.

Still a problem is that if the person prefers to use different stationary telephones when traveling around, other persons telephones and rights connected to those telephones must often be utilised.

The above problems are solved by a stationary telephony or communications terminal, which a subscriber connects to a mobile radio telephony network via the subscriber's mobile radio telephone. The stationary telephony terminal and the mobile radio telephone are connected to each other by a wireless short range communication link. The mobile radio telephone can move and connect different stationary telephony terminals on different locations. The stationary telephony terminals have no own telephone number or other identity in the mobile radio telephony network.

The stationary communications terminal and the mobile radio telephone have each a short range transceiver for the wireless short range link. The stationary communications terminal is made to be as convenient to use as a conventional deskphone. When the mobile radio telephone is in its standby mode and is in range of the wireless short range link of the stationary communications terminal, and before a call is made or answered on the stationary terminal, they perform an identification procedure via the short range link. Outgoing calls can thus be set up and incoming calls can be taken on the stationary terminal.

In an example embodiment the mobile telephone sends an identification, e.g., its telephone number, to the stationary terminal. Before a subscriber keys for a call on the stationary terminal an authorization must be given, e.g., the PIN-code for the subscriber's mobile telephone.

A purpose with the technology described herein is that a subscriber shall have access to a mobile radio telephone, that is easy to carry around, and also have access to a convenient telephony terminal on different locations.

Another purpose is that the subscriber shall have only one telephone number.

Still a purpose is that there shall be only one set of user data for the subscriber in the network.

Yet another purpose is that when the subscriber moves permanently, the set of user data for the subscriber in the network shall remain unchanged.

A purpose is also that the owner of a mobile radio telephone shall be able to prevent others to use his mobile telephone via a stationary telephony terminal.

An advantage with the technology described herein is that the subscriber has a mobile telephone that is easy to carry around and also has access to a convenient telephony terminal on different locations.

Another advantage is that the subscriber needs to have only one telephone number.

Still an advantage is that the subscriber can have access to a convenient telephony terminal on different locations but can avoid to use other persons subscriptions.

Yet another advantage is that the subscriber has access to a convenient telephony terminal and at the same time the set of user data in the network can remain unchanged and no wiring changes are to be made when the subscriber moves permanently.

An advantage is also that the system of the stationary telephony terminal and the mobile can be made safe to prevent illegitimate use of a mobile telephone via the stationary terminal.

The technology will now be further described with the aid of preferred, non-limiting, and example embodiments in connection with enclosed figures.

DETAILED DESCRIPTION

Figure 1:
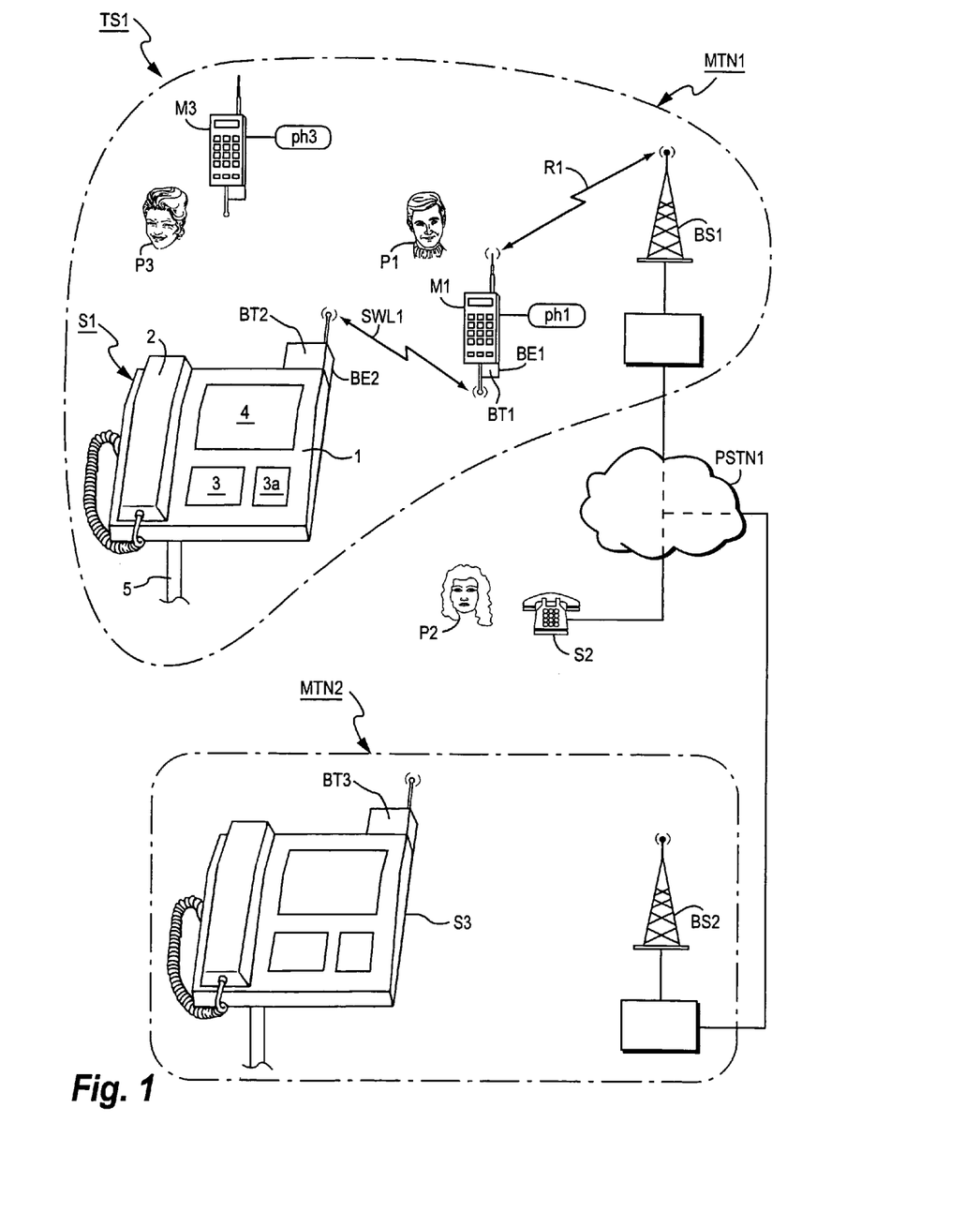
FIG. 1 shows a view over a telephony system.

FIG. 1 shows a survey of a telephony system TS1 with an example embodiment. A first mobile radio telephone M1, having a phone number Ph1, is connected to a first mobile radio telephony network MTN1 via a radio link R1 to a radio base station BS1. This station belongs to the first mobile telephony network. A subscriber telephone S2 is connected to a public telephony network PSTN1, which in turn is connected to the mobile telephony network MTN1. The mobile telephone M1 communicates with an inventive stationary telephony or communications terminal S1 via a short range wireless link SWL1. In the example embodiment, the wireless link SWL1 is a short range BLUETOOTH radio link between BLUETOOTH transceivers, of which a first transceiver BT1 is connected to the mobile telephone M1 and a second transceiver BT2 is connected to the stationary telephony terminal S1. A second mobile radio telephone M3, owned by a subscriber P3, is within the area of the first mobile radio telephony network MTN1. A second mobile radio telephony network MTN2 has a second radio base station BS2, which is connected to the public telephony network PSTN. A second stationary telephony terminal S3, which is placed on a complete different location than the stationary terminal S1, is within a cell covered by the base station BS2 and has a BLUETOOTH transceiver BT3.

In FIG. 1, for the sake of simplicity, the mobile telephony network MTN1 is shown with the only base station BS1. The network is a common mobile network with several base stations, mobile switching centres, gateways and the like, not shown in the figure.

The stationary terminal S1 has similarities with a conventional stationary deskphone in that it has a telephone body 1, a handset 2 and is provided with a keyset 3 and a display 4. As an alternative to the keyset 3 it also has a device 3a for voice command. The terminal S1 differs from the conventional deskphone in that it lacks a wire for connection to a telephony network but has only a power cord 5 connected to a conventional power socket. The stationary terminal S1 also differs from the conventional deskphone in that it has the abovementioned BLUETOOTH transceiver BT2 and in that it lacks an own telephone number. The second stationary telephony terminal S3 is similar to the terminal S1 and functions in the same manner. The stationary terminal S1 will be described more in detail below.

The BLUETOOTH transmission is specified in the BLUETOOTH Specification 1.1. In short BLUETOOTH works in the following manner. BLUETOOTH is a frequecy hopping system with 79 fequencies within a band and with 1600 frequency hops per second. The hops follow a pseudo random hop sequence. Each BLUETOOTH device has a 48-bit IEEE address determined by a manufacturer number and a consecutive number and the hop sequence for a BLUETOOTH device is determined by applying an algorithm on the address. Each BLUETOOTH device has an own clock time and if this time and the address is known it is possible to go directly into the hop sequence for a certain BLUETOOTH device and follow it. The communication between BLUETOOTH devices is organized with a master and one or more slaves forming a pico network, in which the hop sequence is determined by the master.

A BLUETOOTH device can search another BLUETOOTH device by making either a page or an inquiry. In case of page the address of the sought BLUETOOTH device is known to the searching device and in case of inquiry the address is unknown and the sought BLUETOOTH device can be any device. The BLUETOOTH devices listen on 32 different frequencies, about one second for each frequency. A paging BLUETOOTH device sends the address of the sought device, rapidly changing between all 32 frequencies, and will hit the sought device. An inquiring BLUETOOTH device sends a certain code in stead of the address, rapidly changing frequency. A listening device that hears this code responds with its address and clock time. The entire BLUETOOTH specification may be found on the web under.

In brief the stationary terminal S1 is used in the following manner. A subscriber P1, who owns the mobile telephone M1, visits a room with the stationary telephony terminal S1. The mobile M1 has established contact with the mobile network MTN1 via the link R1 and is in its standby position. The subscriber P1 wants to call the telephone S2 and prefers to use the stationary terminal S1, because it has the keyset 3 that is big and easy to use, the display 4 that is big and easy to view and the convenient handset 2. The subscriber lifts the handset 2 and keys the number to the telephone S2 on the keypad 3. A channel on the BLUETOOTH link SWL1 is set up to the mobile telephone M1, which initiates the mobile to switch to its active mode. A channel on the radio link R1 between the base station BS1 and the mobile telephone M1 is set up and the telephone S2 is then called via the mobile network MTN1 and the public network PSTN1 in conventional manner. A subscriber P2 takes the call on the telephone S2 and a conversation can take place.

When the subscriber P2 wants to call the subscriber P1, he dials the number to the mobile telephone M1 on his telephone S2. The call is coupled through the public network PSTN1 and the mobile network MIN1 to the base station BS1, through which a channel on the radio link R1 is set up to the mobile telephone M1. The mobile telephone is initiated to call the stationary terminal S1 via the short range link SWL1. The stationary deskphone generates a ringtone, the subscriber P1 lifts the handset 2 and a conversation between the subscibers P1 and P2 can take place.

to The subscriber M1 can bring the mobile radio telephone M1 along and move to the location for the second stationary telephony terminal S3. There telephony calls can be set up via the stationary terminal S3 and also incoming calls to the mobile M1 can be taken on the terminal S3 in the same way as for the stationary terminal S1.

Figure 2:
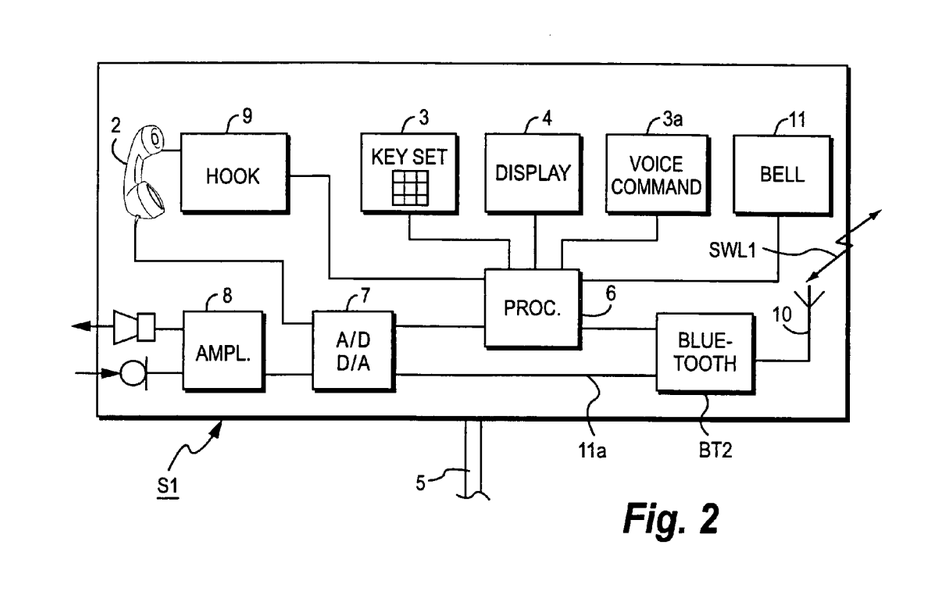
FIG. 2 shows a block diagram over a stationary telephony terminal.

FIG. 2 is a block diagram showing the stationary telephony terminal S1. The latter has a processing unit 6 which is connected to the keyset 3 and the display 4. The processing unit is also connected to an analog-digital converter 7 and to a unit 9 with a hook function. The analog-digital converter is connected to an amplifier 8 for a loudspeaker or microphone function and to the handset 2, which actuates the hook function 9. The BLUETOOTH transceiver BT2 is connected to the processing unit 6 and is also connected to the analog-digital converter 7 an has an antenna 10 for the short range link SWL1. The transceiver BT2 has also a direct connection 11a, past the processing unit 6, for exchaning speech signals with the converter 7. A bell 11 is connected to the processor 6. The display 4 is a conventional one and is controled by the processing unit 6. Telephone numbers are keyed on the keyset 3, which also is used to key codes for programming the functions of the processor 6, as will be discussed later. The unit 9 has a common hook function, which indicates hook-on or hook-off position of the handset 2 and actuates the processor 6. The handset 2 is a common one with microphone and loudspeaker. Also the amplifier 8 is a common one for processing speech signals when the telephony terminal S1 is set in a loudspeaking position. The converter 7 converts speech signals analog-to-digital and digital-to-analog in conventional manner. The BLUETOOTH transceiver BT2, having a BLUETOOTH device address BE2, transmits and receives speech and signalling information on the link SWL1. When a telephone number is keyed on the keypad 3, the number is processed in the processor 6 and corresponding signals are sent by the trasceiver BT2 to the trasceiver BT1 in the mobile telephone M1. Speech signals via e.g., the handset 2 are transceived by the transceiver BT2. For an incoming call to the mobile telephone M1 and the stationary terminal S1 the transceiver BT2 receives a ring initiating signal, which initiates the processor to generate a ring signal on the bell 11. In an alternative embodiment the stationary terminal is used so that it is the mobile that is ringing while the call still can be taken on the terminal.

Figure 3:
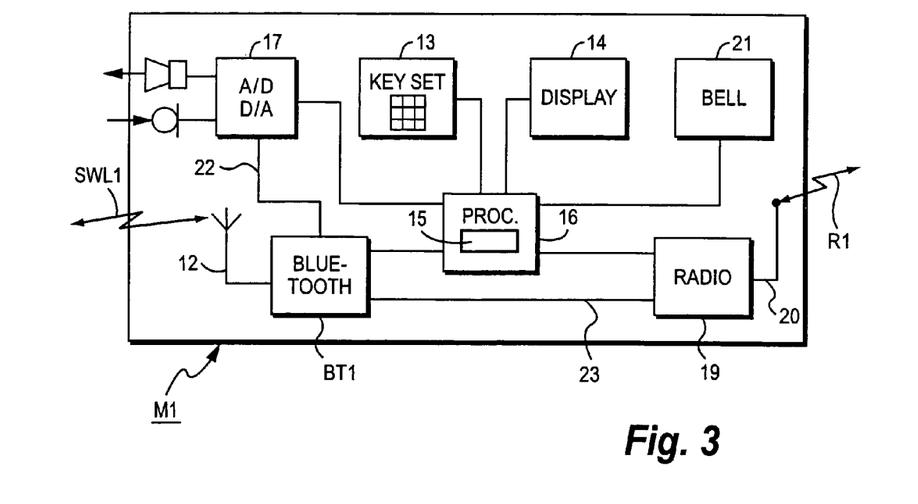
FIG. 3 shows a block diagram over a mobile telephone.

FIG. 3 is a block diagram showing the mobile telephone M1. The mobile has a processing unit 16 which is connected to a keyset 13 and a display 14. The processing unit 16 is also connected to an analog-digital converter 17 which in turn is connected to a microphone and a loudspeaker. A bell 21 is connected to the processing unit. The mobile phone also has a radio circuit unit 19 which is connected to the processing unit 16 and has an antenna 20 for the radio link R1. The BLUETOOTH transceiver BT1 is connected to the processing unit 16 and has an antenna 12 for the short range link SWL1. The transceiver BT1 has a direct connection 22 to the converter 17 and a direct connection 23 to the radio unit 19. The direct connections 22 and 23 are used for exchange of speech signals past the processing unit 16. The processing unit 16 is loaded with software 15. The display 14 is a conventional one and is controlled by the processing unit. The keyset 13 is also conventional and is used to key telephone numbers, control menus on the display etc. The radio circuit unit 19 transmits and receives radio signals in conventional manner and the analog-digital converter 17 converts speech signals, also in conventional manner. The BLUETOOTH transceiver BT1 transmits and receives speech and signalling information on the link SWL1. The processing unit 16 performs conventional operations in a mobile phone and the software 15 performs operations which are required in the present technology. The transceiver BT1 has a BLUETOOTH device address BE1 and can be set in different modes by pressing buttons on the keyset. A first mode is e.g., for communication with a conventional BLUETOOTH headset and a second mode is for communication with the transceiver BT2 in the stationary telephony terminal S1. As an alternative mode a subscriber can talk and listen via the headset, but still keys numbers on the stationary terminal. When an incoming call comes to the mobile telephone M1 and the transceiver BT1 is in the second mode, the call is sent on to the transceiver BT1 by the software 15. Among others the ring initiating signal in the call is handled by the software 15 and is transmitted to the transceiver BT1 instead of being transmitted to the bell 21. A telephone number keyed on the keyset 3 on the stationary terminal S1 is transmitted via the short range link SWL1 to the transceiver BT1 and to the processing unit 16. With the aid of the software 15 the telephone number is transmitted from the mobile phone via the link R1 as if it was keyed directly on the keyset 13. In an alternative embodiment the ring initiating signal is transmitted to both the bell 21 and to the transceiver BT1 and in still an alternative only to the bell 21.

In connection with signalling diagrams in FIGS. 4 to 11 it will be described in closer detail how the stationary telephony terminal S1 works and is used when communicating with the telephone S2.

Discovery Phase 1

Figure 4:
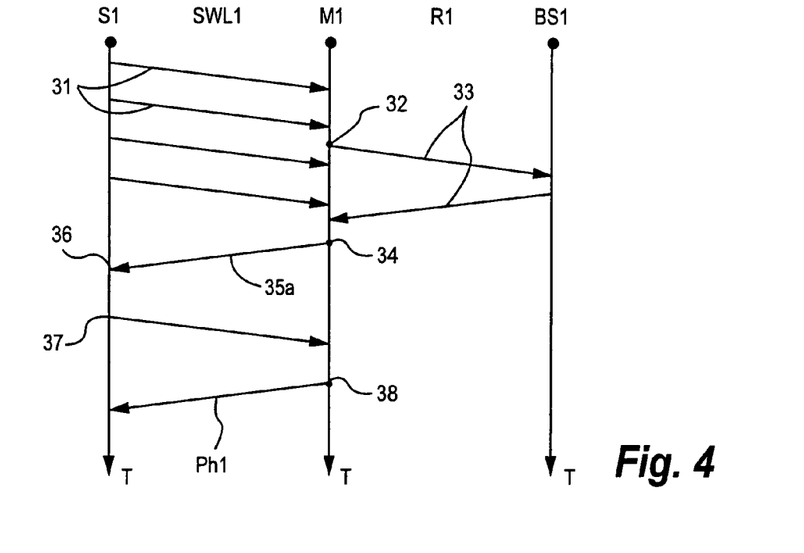
FIG. 4 is a signalling diagram for a first discovery phase.

FIG. 4 is a signalling diagram for the stationary telephony terminal S1, the mobile telephone M1 and the base station BS1, in which diagram the time is denoted by T. The situation in connection with FIG. 4 is that the stationary telephony terminal S1 stands in a room, is powered from a common power socket and is switched on. The terminal transmits repeatedly inquiry signals 31 by its BLUETOOTH transceiver BT2 over the BLUETOOTH short range link SWL1. The terminal thereby requests for contact with other BLUETOOTH devices. The subscriber P1 comes into the room with the mobile telepone M1 and switches it on at a moment 32. Signals 33 are sent by the radio unit 19 on a signalling channel over the radio link R1 between the mobile M1 and the basestation BS1. The network MTN1 recognizes the mobile M1 and notes its geographical position. This is performed in a conventional manner and the mobile is in its standby mode. In an alternative the mobile M1 is already switched on and has contact with the base station BS1 when it comes in range of the BLUETOOTH transceiver BT2 at the moment 32. The mobile receives the inquiry signals 31 via its BLUETOOTH transceiver BT1. At a moment 34 the mobile M1 sends inquiry response signals 35a back to the stationary terminal S1 on the channel 35. The response signals 35a includes the BLUETOOTH address and the clock time for the terminal BT1, according to the BLUETOOTH specifications. At a moment 36 the terminal S1 receives the signals 35a and a piconet with the transceiver BT2 as master and the transceiver BT1 in the mobile telephone as slave is set up with a page/page response sequence as described in the BLUETOOTH specifications. This sequence is not shown in the figure. At a moment 37 the terminal BT2 identifies itself as a stationary terminal with an identification signal. At a moment 38 the terminal BT1 identifies itself as a mobile with an identification signal, which includes the mobile telephony number Ph1.

The use of the stationary terminal S1 requires in many cases an authentication as will be described in connection with FIG. 9.

In an alternative embodiment the BLUETOOTH terminal BT2 directly pages the BLUETOOTH terminal BT1, if the terminal BT2 already has the BLUETOOTH device address for the terminal BT1. When this terminal responds on the page the piconet is established. Also other mobile telephones with BLUETOOTH transceivers can be connected as slaves in the piconet with the transceiver BT2 as master. If the mobiletelephone M1 with the transceiver BT1 moves out of range from the stationary terminal S1 with the transceiver BT2 so that the piconet connection is lost, when it returns the piconet will again be restored as described above.

Incoming Call to the Stationary Telephony Terminal S1

Figure 5:
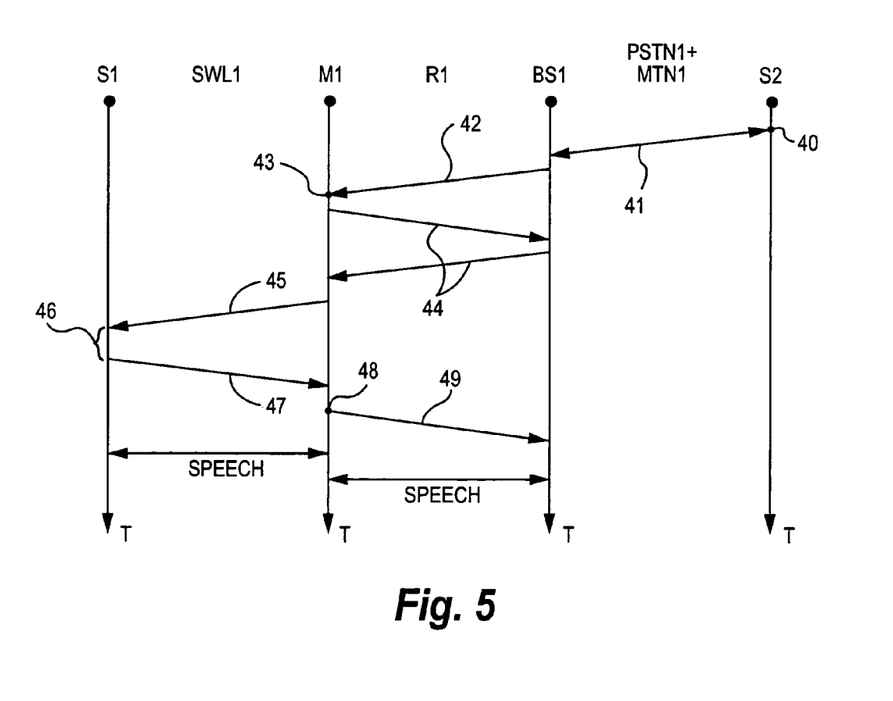
FIG. 5 is a signalling diagram for an incoming call to the mobile telephone/stationary telephony terminal.

FIG. 5 is a signalling diagram for the setting up of a call from the telephone S2 in the public network PSTN1 to the mobile telepone M1, when the mobile subscriber P1 selects to take the call on the stationary telephony terminal S1. The discovery phase is already completed as described above.

The subscriber P2 dials at a moment 40 the telephony number to the mobile telephone M1 on the telephone S2. The call is coupled through the networks PSTN1 and MTN1 in conventional manner to the base station BS1, denoted by reference 41. The mobile telephone is called, denoted by reference 42, via the base station on a signalling channel over the radio link R1 by a message "Incoming call." At a moment 43 the mobile notes the incoming call from the telephone S2. By signalling 44 a speech channel between the base station BS1 and the mobile telephone M1 is allocated in conventional manner. The mobile M1 is a slave in the pico network with the terminal S1 as master. It thus transmits the message "Incoming call" on the already established BLUETOOTH channel to the terminal S1 with the aid of the software 15. This transmission comprises in the present embodiment the telephony number of calling telephone S2 and is denoted by reference 45. A ring signal is generated in the mobile M1, the subscriber P1 lifts the handset 2 of the stationary terminal and the hook function 9 is activated, which is all denoted by reference 46. A response signal is sent to the mobile, indicating that the stationary telephony terminal S1 will answer the call (off-hook), and including an authentication code that the subscriber has keyed earlier, all denoted by reference 47, and a speech channel over the BLUETOOTH link SWL1 is set up. The mobile M1 also receives the off-hook message at a moment 48. The off hook message initiates the mobile M1 to send a message with the aid of the software 15 to the mobile network MTN1 via the base station BS1, denoted by reference 49. This message correspond to the message which is sent when the subscriber P1 takes a call directly on the mobile M1 by pressing the "Answer" button. The earlier designated speech channel to the base station is set up at a moment 50 and a conversation can take place.

Call Released from the Stationary Telephony Terminal S1

Figure 6:
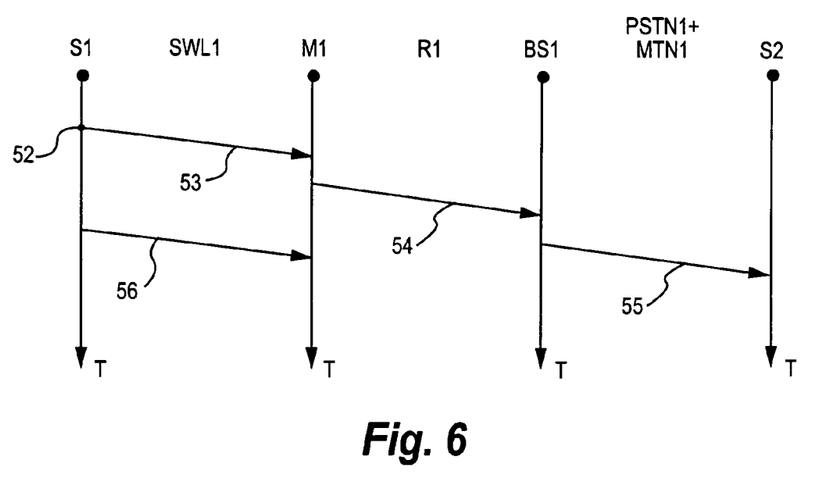
FIG. 6 is a signalling diagram for call release from the stationary terminal.

FIG. 6 is a signalling diagram for the release of the call by the stationary telephony terminal S1.

The subscriber P1 replaces the handset 2 at a moment 52 and the hook function 9 is deactivated. As denoted by reference 53 the mobile telephone M1 is informed of this fact via a signalling channel over the BLUETOOTH link SWL1. The software 15 activates the mobile telephone to signal the call release to the network over a signalling channel on the link R1, referenced by 54. This is performed in the same way as if a corresponding release button on the keyset 13 of the mobile was pressed. The channel through the networks MTN1 and PSTN is released, which is denoted by reference 55, and the speech channel over the BLUETOOTH link SWL1 is released, denoted by reference 56.

Call Released from the Telephone S2

Figure 7:
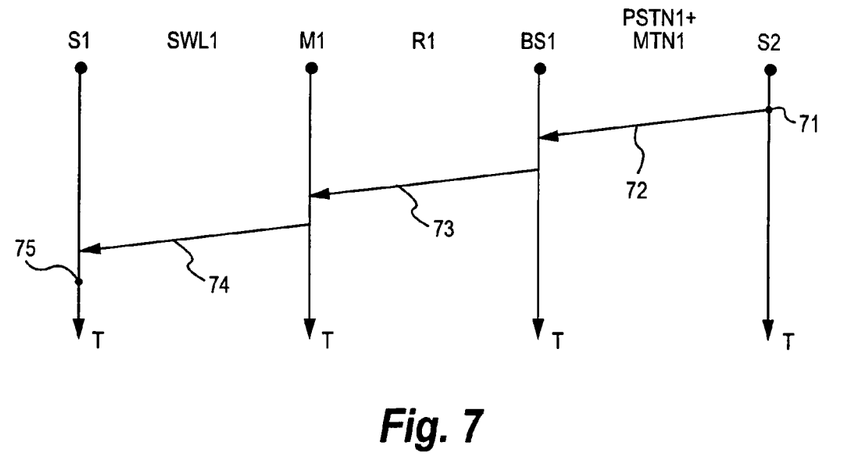
FIG. 7 is a signalling diagram for call release from a subscriber having a call to the stationary terminal.

FIG. 7 is a signalling diagram for the release of the call by the telephone S2 in the public network PSTN1.

The subscriber P2 goes on-hook at a moment 71, which is signalled through the networks PSTN1 and MTN1 as denoted by the reference 72. The base station BS1 signals the call release to the mobile M1 as denoted by the reference 73. The processing unit with the software 15 is activated and sends a release signal to the stationary telephony terminal S1, denoted by reference 74. The connection between the stationary telephony terminal S1 and the telephone S2 is released in a conventional manner. At a moment 75 the subscriber P1 goes on-hook.

Outgoing Call from the Stationary Telephony Terminal S1

Figure 8:
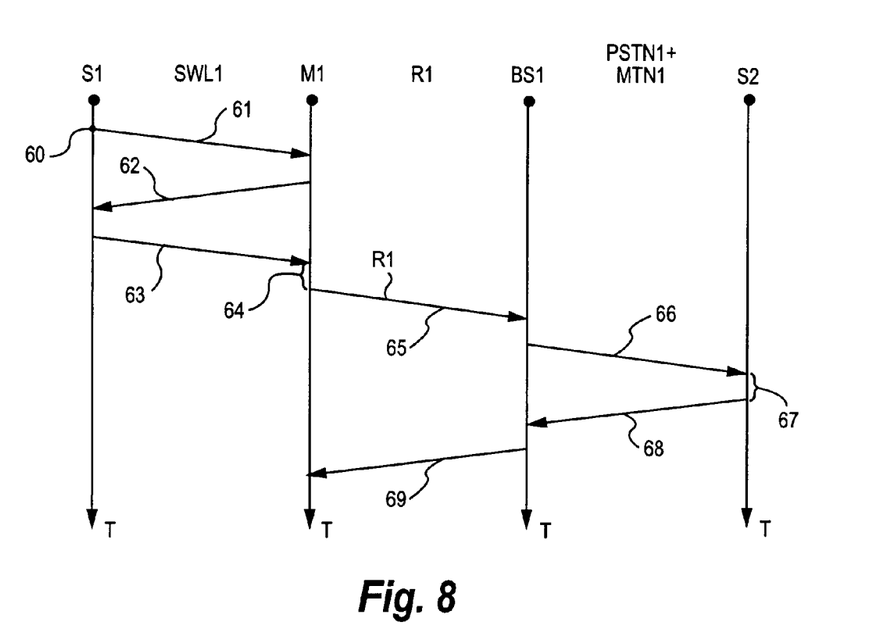
FIG. 8 is a signalling diagam for setting up a call from the stationary telephony terminal.

FIG. 8 is a signalling diagram for the setting up of a call from the stationary telephony terminal S1 to the telephone S2 in the public network PSTN1 via the mobile telepone M1. The discovery phase is already completed and the BLUETOOTH piconet is established as described above.

The subscriber P1 lifts the handset 2 at a moment 60 and the hook function 9 is activated. The subscriber keys the telephone number to the called subscriber telephone S2 and presses a "yes" button when the number is completed. A BLUETOOTH speech channel 61 is set up. As mentioned the subscriber P1 has earlier keyed and stored an authentication code, which is now transmitted on the short range link SWL1 to the mobile telephone M1. The authentication is accepted by the mobile M1 as denoted by reference 62. The button pressings in the dialled number are transmitted to the mobile telephone M1, which transmission is denoted by reference 63. In an alternative the transmissions 61 and 63 are combined into one. The software 15 is activated by the transmitted button pressings and influences the processing unit 16 in the same way as if the the telephone number was keyed by the buttons on the key pad 13 of the mobile telephone M1. This is denoted by reference 64. A signalling channel is set up between the mobile M1 and the base station BS1, referenced 65, and in a conventional manner a speech channel is allocated. The connection is set up through the networks MTN1 and PSTN1, as denoted by reference 66, and on a ring signal the subscriber P2 lifts his handset on the telephone S2, denoted by reference 67. This lifting is transmitted back to the base station BS1, denoted by reference 68, and the earlier allocated speech channel is set up, which is denoted by reference 69. A conversation between the subscribers P1 and P2 can take place.

In the above examples it is mentioned that the subscriber P1 has his mobile radio telphone M1 on, the BLUETOOTH transceivers BT1 and BT2 are within range of each other, the mobile M1 has identified itself to the stationary terminal S1, and the subscriber P1 has to key an authentication code on the stationary terminal S1, that the terminal S1 will send to the mobile M1. The subscriber then can key a telephone number on the stationary telephony terminal S1 to reach the called subscriber or take an incoming call. Authentication is desirable in many situations because the subscriber P3 in FIG. 1 can come into the room and bring an own mobile telephone M3 with him, that is in standby position. When a call is keyed on the stationary terminal S1 the question arises whose mobile telephone is to be used. Also, a person can on the sly place a stationary telephony terminal near to a mobile telephone and without permission try to make outgoing calls and take incoming calls on that mobile telephone. This is prevented by the authentication. It should anyhow be noted that in some cases the authentication is unnecessary, e.g., if the mobile phone is used in environments where only trusted persons or devices are within BLUETOOTH range, or if the functionality for connecting to stationary deskphones as described here is turned off when the mobile phone is used in non trusted environments.

It has been mentioned above that setting up and taking a call on the stationary terminal S1 can involve an authentication. To facilitate the use of the stationary terminals a relation between the stationary terminal and the mobile telephone can be defined with the aid of a code as will be described below in connection with FIGS. 9 and 11.

Use of Service Code 1

Figure 9:
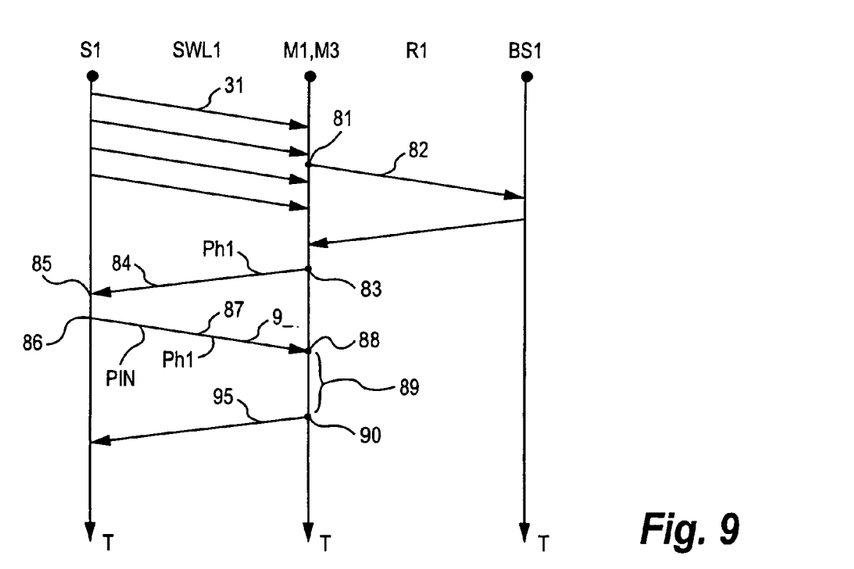
FIG. 9 is a signalling diagram for a first authentication procedure.

FIG. 9 is a signalling diagram for an identification and authentication procedure between the mobile telephone M1 and the stationary telephony terminal S1. As in FIG. 4, the stationary terminal S1 transmits the inquiry signals 31, announcing itself. At a moment 81 the mobile telephone M1 is switched on and begins to interchange signals 82 with the base station BS1 in a conventional manner. The mobile telephone M1 is programmed, via the software 15, to identify itself before the stationary terminal S1 not only as a mobile telephone but as an individual one. At a moment 83 the BLUETOOTH terminal BT1 of the mobile radio telephone M1 receives the signal 31, the piconet is set up as earlier described and the BLUETOOTH address BE1 and clock time for the BLUETOOTH terminal BT1 is transmitted according to the BLUETOOTH specification. With the aid of the software 15 the terminal BT1 automatically transmits its telephone number Ph1=23397 with an identification signal 84. At a moment 85 the stationary terminal S1 receives, via the transceiver BT2, the signal 84. It now has safely the information that the BLUETOOTH trasceiver BT1, with the identity BE1, represents the individual mobile radio telephone M1 with the telephone number Ph1=23397. This information is stored. Note that stationary terminal S1 not yet can be used for a call via the mobile telephone M1. Other mobile telephones, e.g., the mobile telephone M3, can move near to the stationary telephony terminal S1 and identify themselves in the same manner.

The subscriber P1, owner of the mobile M1, now has to key a code on the stationary telephony terminal S1 to set this terminal in a mode for communicating with the mobile telephone M1.

First a service code 91, 92 or 93 is to be keyed, indicating how long a time interval for the communication mode will be. Then the telephone number 23397 of the mobile radio telephone M1 has to be keyed and at last, for authentication, the PIN-code 1234 of the mobile phone M1 is keyed. Thus the total code *9_23397*1234# is keyed at a moment 86, where 9_ denotes any of the service codes. The keyed information is stored in the stationary telephony terminal S1. A relation between the mobile telephone M1 and the stationary telephony terminal is now established. Provided that the entered PIN code is correct, outgoing calls can now be set up and incoming calls can be taken on the stationary telephony terminal S1. From the telephone number 93397, the stationary telephony terminal S1 knows the corresponding BLUETOOTH address BE1 of the mobile telephone M1 to which messages should be sent, and by providing the PIN code, the stationary telephony terminal S1 shows to the mobile telephone M1 that it is authorised to communicate via the mobile telephone M1.

The PIN code is not sent from the stationary telephony terminal S1 to the mobile telephone M1 until a call is actually to be made or answered on the stationary telephony terminal S1.

In an alternative, when the PIN code 1234 has been entered it is transmitted in a message 87 to the mobile telephone M1. The mobile telephone M1 receives the message at a moment 88 and checks the PIN code for correctness in the time interval 89. At a moment 90 the mobile telephone M1 sends a reply message 95 to the stationary telephony terminal S1, indicating if the PIN code was correct or not. The stationary telephony terminal S1 receives the message and can indicate the result to the user by an audiable message or a message on the display.

When the stationary telephony terminal S1 receives an "incoming call" message from another mobile telephone, e.g., the mobile telephone M3, it will find out by checking the previously stored information, that the telephone number Ph3 that corresponds to the BLUETOOTH device address of M3, is not the number Ph1 of the mobile telephone M1, with which the stationary telephony terminal S1 currently has a relation. Therefore, the terminal S1 will not sound a ring signal.

As mentioned in the example above the service code 91, 92 or 93 has to be keyed. In the example the service code is denoted by 9_ to cover all situations. The service code is given the following meaning in the present example:

Code 93 is permanent and is intended to be used by, e.g., the subscriber P1 having the stationary telephony terminal on his ordinary desk. Once the subscriber has keyed the code *9323397*1234#, he needs not to key it again. He needs only to have his mobile telephone M1 on, key a telephone number to a called subscriber on the stationary terminal S1 or directly take an incoming call on the stationary terminal S1. This situation will endure for as long time as the subscriber decides.

Code 92 is to be used in the same way as code 93, with the exception that it will only endure for a limited time interval. This interval can be e.g., one day or for as long time as the mobile telephone is in range of the short range transceiver BT2.

Code 91 is intended to be used for one call only. The subscriber P3 with the mobile telephone M3 in standby position comes into the room in which the stationary telephony terminal S1 is located, see FIG. 1. The mobile telephone M3 has a number 23399. When the subscriber P3 wants to make a call on the stationary terminal S1, he first has to key his code *9123399*4321# on the stationary telephony terminal S1 and can then make the call. When the call is finished the code will be deleted. If a call comes to the mobile telephone M3 and the subscriber P3 wants to take the call on the stationary telephony terminal S1, the subscriber has to first key his code *9123399*4321#.

The processor 6 in the stationary terminal S1 can be programmed such that a lower-number service code overrides a higher number, but when the session or the call with the overriding service code ends, the previous service code is restored. This means that a subscriber, having the stationary terminal in his office, can key the service code 93 and always have access to the terminal when in office. Still someone else can use the stationary terminal for a call by keying the service code 91. The stationary terminal can also be conveniently used by a person visiting the office for a few hours by keying the service code 92. When this person leaves the office the stationary telephony terminal goes back to the original subscriber. Many persons can be in a room with a stationary telephony terminal and have their mobile radio telephones in standby mode. When a mobile telephone rings the person can immediately take the call on the stationary terminal by using the service code 91.

In the above embodiment it is the telephone number Ph1 of the mobile radio telephone M1 that is the identification code. As an alternative to the telephone number Ph1 the subscriber can select another own code.

The authentication number is, in the above embodiment, the PIN code of the mobile telephone M1. Also other authentication codes can be used that the subscriber selects.

The subscriber had to key the service code 9_ in the above embodiment, before the called subscriber's telephone number was keyed. The service code, if any, can be performed in a number of different ways. It can e.g., comprise only two codes, one for permanent authentication and one for a single call. It can also have codes on top of the codes 91, 92 and 93, e.g., a code for a predetermined number of calls decided by the owner of stationary telephony terminal S1.

Also, in the above embodiment, the authentication was checked in the mobile telephone M1 during the time interval 89. Such a check can be transmitted from the mobile telephone M1 over the link R1 to the base station BS1. The authentication check is then performed in the land system of the mobile radio telephony network MTN1.

In the above embodiment the service code was given by pressing buttons 91, 92 or 93 on the keypad of the stationary terminal S1. An alternative is that the terminal has a button designated for each of the codes or a corresponding menu driven interface.

In the above embodiments the stationary terminal S1 sends the inquiry signal from the BLUETOOTH transceiver to establish the pico network according to the BLUETOOTH specification. If the BLUETOOTH transceiver of the mobile telephone is known to the BLUETOOTH transceiver of the stationary terminal, it can make a page which is somewhat faster than an inquiry.

Discovery Phase 2

Figure 10:
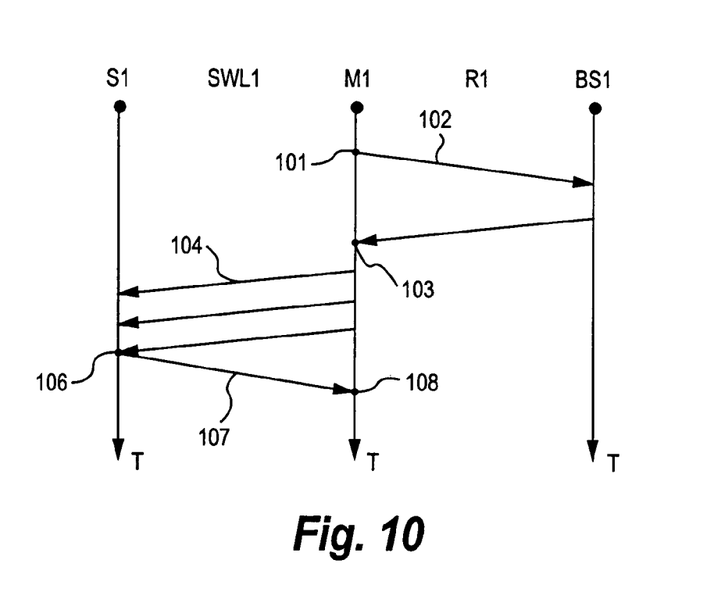
FIG. 10 is a signalling diagram for a second discovery phase.

FIG. 10 is a signalling diagram for the stationary telephony terminal S1, the mobile telephone M1 and the base station BS1. The situation in connection with FIG. 10 is that the stationary telephony terminal S1 stands in a room, is powered from a common power socket and is switched on. Compared with the situation in FIG. 4, Discovery phase 1, in FIG. 10 it is the mobile radio telephone M1 that sends inquiry signals. The subscriber P1 comes into the room with the mobile telepone M1 and switches it on at a moment 101. Signals 102 are sent by the radio unit 19 on a signalling channel over the radio link R1 between the mobile telephone M1 and the basestation BS1. The network MTN1 recognizes the mobile telephone M1 and notes its geographical position. This is made in a conventional manner and the mobile telephone is in its standby mode. At a moment 103 the mobile telephone begins to repeatedly send inquiry signals 104 by its BLUETOOTH transceiver BT1 on a channel 105 over the BLUETOOTH short range link SWL1. The stationary telephony terminal S1 receives the inquiry signals 104 via its BLUETOOTH transceiver BT2 and at a moment 106 it sends inquiry response signal 107 back to the mobile telephone M1. The response signal 107 includes the address and the clock time for the BLUETOOTH terminal BT2. At a moment 108 the mobile radio telephone M1 receives the signal 107. A piconet with M1 as master is then established through a page/page response sequence as described in the BLUETOOTH specification (not shown). In an alternative, a master/slave switch is then performed so that the stationary telephony terminal S1 becomes the master of the piconet.

Use of Service Code 2

Figure 11:
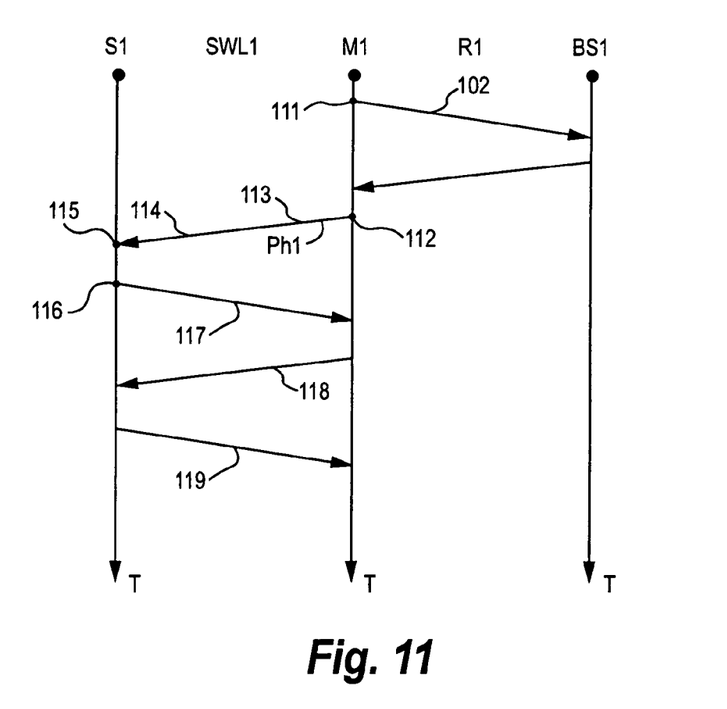
FIG. 11 is a signalling diagram for a second authentication procedure.

FIG. 11 is a signalling diagram for an identification and authentication procedure between the mobile telephone M1 and the stationary telephony terminal S1. In this embodiment it is the mobile telephone M1 that transmits the inquiry signal. At a moment 111 the mobile telephone M1 is switched on and begins to interchange the signals 102 with the base station BS1 in a conventional manner. The mobile telephone M1 is programmed, via the software 15, to identify itself before the stationary terminal S1 not only as any mobile telephone but as an individual one. At a moment 112 the mobile radio telephone M1 transmits the inquiry signal 113. At a moment 115 the stationary terminal S1 receives, via the transceiver BT2, the inquiry signal. At a moment 116 the stationary telephony terminal S1 sends an inquiry response signal 117 back to the mobile radio telephone M1. A piconet with the mobile M1 as master is then established through a page/page response sequence as described in the BLUETOOTH specification (not shown). In an alternative, a master/slave switch is then performed so that the stationary telephony terminal S1 becomes the master of the piconet. With the aid of the software 15 the mobile telephone also automatically transmits its telephone number Ph1=23397 from the BLUETOOTH transceiver BT1 with an identification signal 118. The terminal S1 identifies itself as a stationary telephony terminal with an identification signal 119. The terminal S1 now safely has the information that the BLUETOOTH transceiver BT1, with the identity BE1, represents the individual mobile radio telephone M1 with the telephone number Ph1=23397. This information is stored. Other mobile telephones, e.g., the mobile telephone M3, can move near to the stationary telephony terminal S1 and identify themselves in the same manner. The subscriber P1, owner of the mobile M1, now has to key the previous mentioned code on the stationary telephony terminal S1 to set this terminal and the mobile telephone M1 in a mode for communicating with each other. This communication is performed as described in connection with FIG. 9 and is not shown in FIG. 11.

In connection with flow charts in FIGS. 12 to 15 the above described methods in connection with the stationary telephony terminal S1 will be described in summary.

Figure 12:
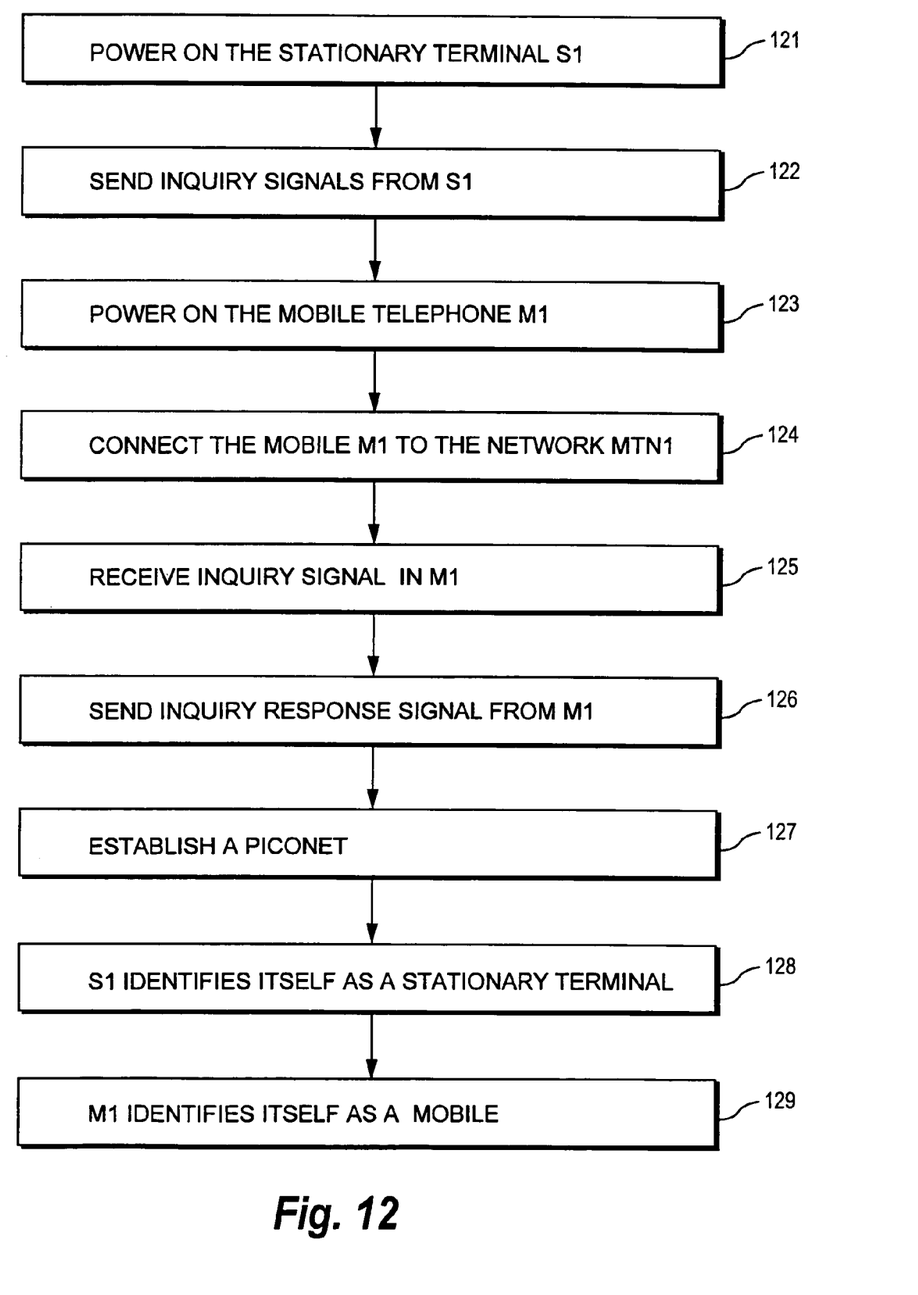
FIG. 12 is a flow chart over the first discovery phase.

FIG. 12 shows a flow chart with the above "Discovery phase 1". In a step 121 the stationary telephony terminal S1 is powered on. Step 122 shows the transmitting of the inqury signals 31 from the stationary terminal S1. The mobile radio telephone M1 is powered on in a step 123, and in a step 124, the mobile telephone is connected to the mobile radio telephony network MTN1. In a step 125, the mobile telephone M1 receives the inquiry signal and sends the inquiry response signal 35a in a step 126. A piconet is established in a step 127. In a next step 128, the terminal S1 identifies itself as a stationary telephony terminal, and in a step 129, the mobile M1 identifies itself as a mobile radio telephone.

Figure 13:
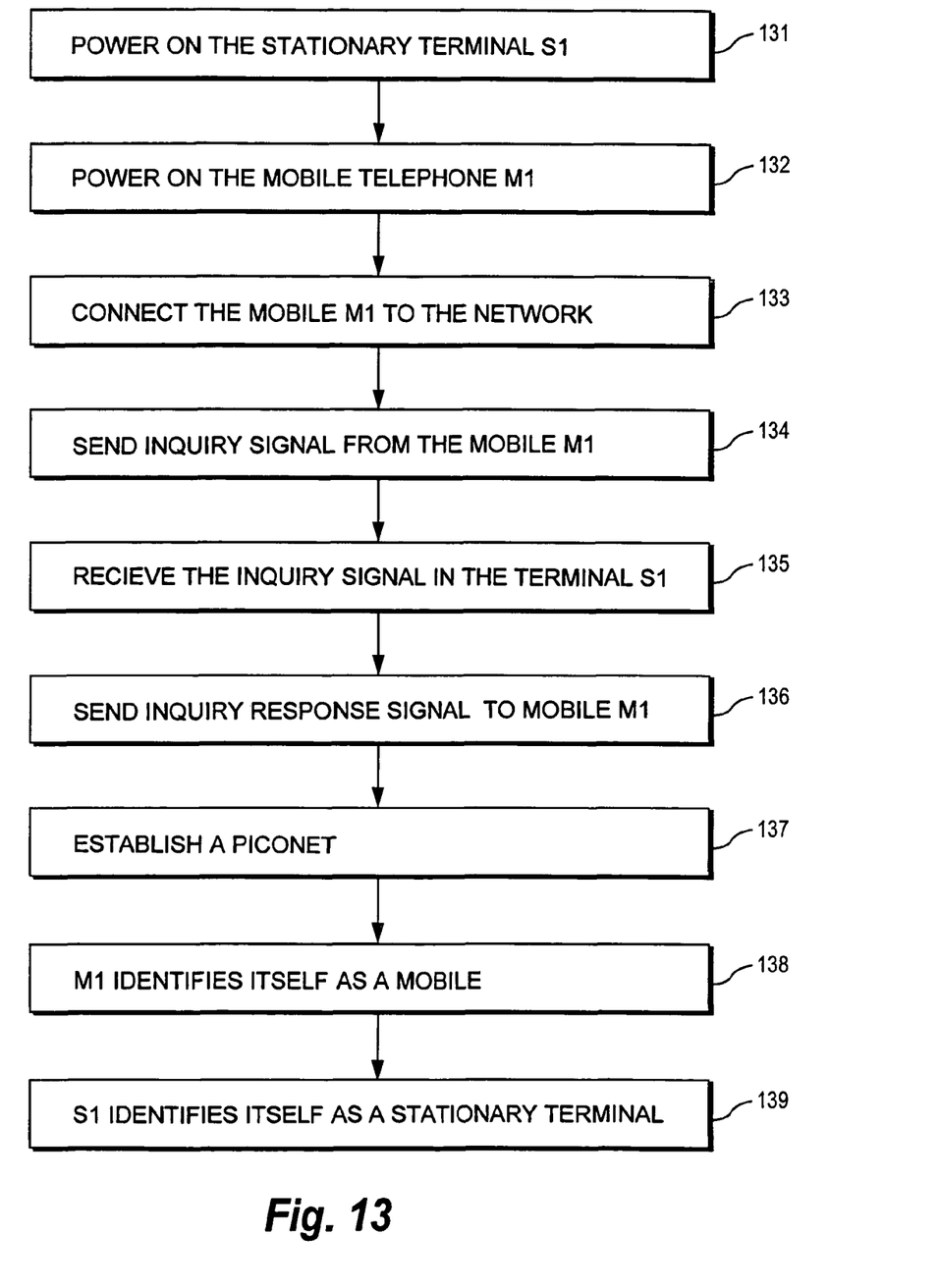
FIG. 13 is a flow chart over the second discover phase.

FIG. 13 shows a flow chart with the above "Discovery phase 2". In a step 131 the stationary telephony terminal S1 is powered on and in a step 132 the mobile radio telephone M1 is powered on. The mobile M1 is connected to the mobile radio telephony network MTN1 in a step 133 and in a step 134 the mobile transmits the inquiry signal 104. The stationary terminal S1 receives the inquiry signal 104 in a step 135 and in a step 136 it transmits the inquiry response signals 107 to the mobile telephone M1. A piconet is established in a step 137. In a step 138 the mobile M1 identifies itself as a mobile radio telephone with its number and in a step 139 the stationary terminal S1 identifies itself as a stationary telephony terminal.

Figure 14:
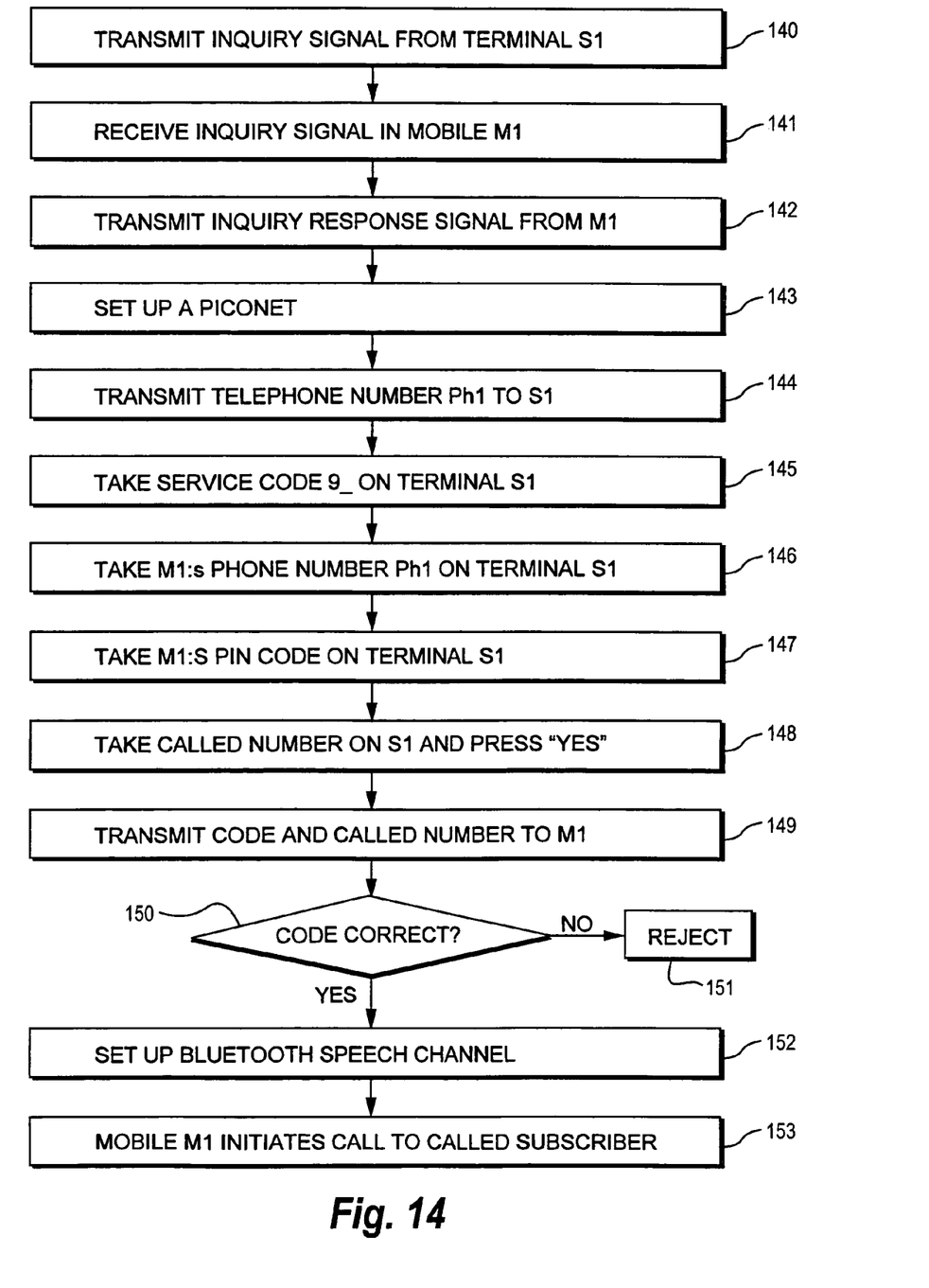
FIG. 14 is a flow chart over the first authentication procedure.

FIG. 14 shows a flow chart over a procedure use of service code when a call is made. It is presumed that the stationary telephony terminal S1 is powered on and the mobile radio telephone M1 is also powered on and is in contact with the mobile radio telephony network MTN1 via the radio link R1. In a step 140 the stationary terminal S1 transmits the inquiry signal 31 and in a step 141 the mobile radio telephone M1 receives these inquiry signals. Trigged by the inquiry signal the mobile telephone M1 transmits the inquiry response signal 84 with the BLUETOOTH identity BE1 in a step 142. In a step 143 the piconet is set up and in a step 144 the telephone number Ph1=23397 is transmitted to the stationary terminal S1. To be able to use the stationary terminal for a call the subscriber P1 now keyes on the stationary terminal S1 the service code 9_ in a step 145. In a step 146 the subscriber keyes the mobil's phone number Ph1=23397 on the stationary terminal and in a step 147 the subscriber keyes the mobile's PIN code 1234 on the stationary terminal S1. The stationary terminal is now ready for use for as long time as the service code 9_ permits. The subscriber P1 keyes the number to the called subsriber S2 and presses the "yes" button in a step 148. In a step 149 the keyed subscriber number and the total code *9__93397*1234# is transmitted from the stationary terminal S1 to the mobile telephone M1 in a step 149. In a step 150 it is checked that the PIN code is correct. This check can be performed in the mobile telephone M1 or in the land system of the mobile network MTN1. If the code is wrong, an alternative "NO", the call is rejected in a step 151. If on the other hand the code is correct, an alternative "YES", a BLUETOOTH speech channel is set up on the link SWL1, step 152. In a step 153 the mobile M1 initiates a call to the telephone S2.

The above described non-limiting and example embodiments can be further varied in a number of ways. An example is that the BLUETOOTH transceivers BT1 and BT2 can be replaced by optical IR transceivers. Another example is that the keying of telephone numbers on the keypad 3 can be replaced by voice commands, which are processed in the device 3a.

The invention claimed is:

1. A stationary communications terminal configured to:
communicate with a short range transceiver over a short range wireless communication link, and
communicate speech over the short range wireless link via a mobile telephone radio connected to a mobile telephony network over a radio link separate from the short range wireless link such that a call can be made using the stationary communications terminal via the short range wireless link, the mobile telephone radio, and the mobile telephony network.

2. The stationary communications terminal according to claim 1, wherein the stationary communications terminal includes short range wireless communications circuitry.

3. The stationary communications terminal according to claim 1, wherein the stationary communications terminal is coupled to short range wireless communications circuitry.

4. The stationary communications terminal according to claim 1, wherein the stationary communications terminal includes or is coupled to a handset.

5. The stationary communications terminal according to claim 1, wherein the stationary communications terminal includes or is coupled to a hook function.

6. The stationary communications terminal according to claim 1, wherein the stationary communications terminal includes or is coupled to a microphone and speaker.

7. The stationary communications terminal according to claim 1, wherein the stationary communications terminal includes or is coupled to a keyset.

8. The stationary communications terminal according to claim 1, wherein the stationary communications terminal includes or is coupled to a display.

9. The stationary communications terminal according to claim 1, wherein the stationary communications terminal includes or is coupled to a device for alerting a user of an incoming call.

10. A method for communicating via a communication arrangement including a mobile radio for communicating over a radio link with a mobile radio telephony network and a stationary communications terminal, the method comprising:
communicating via a short range wireless communication link between the stationary communications terminal and the mobile radio, where the short range wireless communication link is separate from the radio link;
establishing a speech channel over the short range wireless communication link for carrying speech signals between the stationary communications terminal and the mobile radio; and
communicating speech to or from the stationary communications terminal over the mobile radio telephony network via the mobile radio with another device communicating with the radio telephony network.

11. The method in claim 10, wherein the stationary communications terminal includes short range wireless communications circuitry.

12. The method in claim 10, wherein the stationary communications terminal is coupled to short range wireless communications circuitry.

13. The method in claim 10, wherein the stationary communications terminal includes or is coupled to a handset.

14. The method in claim 10, wherein the stationary communications terminal includes or is coupled to a hook function.

15. The method in claim 10, wherein the stationary communications terminal includes or is coupled to a microphone and speaker.

16. The method in claim 10, wherein the stationary communications terminal includes or is coupled to a keyset.

17. The method in claim 10, wherein the stationary communications terminal includes or is coupled to a display.

18. The method in claim 10, wherein the stationary communications terminal includes or is coupled to a device for alerting a user of an incoming call.

* * * * *

UNITED STATES PATENT AND TRADEMARK OFFICE
CERTIFICATE OF CORRECTION

| | | |
|---|---|---|
| PATENT NO. | : 8,170,472 B2 | Page 1 of 2 |
| APPLICATION NO. | : 12/805383 | |
| DATED | : May 1, 2012 | |
| INVENTOR(S) | : Andreason | |

It is certified that error appears in the above-identified patent and that said Letters Patent is hereby corrected as shown below:

On the title page, item (75), under "Inventor", in Column 1, Line 1, delete "Tyreso" and insert -- *Tyresö* --, therefor.

On the title page, item (73), under "Assignee", in Column 1, Line 1, delete "(pul)," and insert -- (publ), --, therefor.

On Page 2, item (56), under "OTHER PUBLICATIONS", in Column 2, Line 13, delete "1.0. B," and insert -- 1.0 B, --, therefor.

In Column 3, Line 18, delete "diagam" and insert -- diagram --, therefor.

In Column 4, Line 11, delete "frequecy" and insert -- frequency --, therefor.

In Column 4, Line 12, delete "fequencies" and insert -- frequencies --, therefor.

In Column 4, Line 61, delete "MIN1" and insert -- MTN1 --, therefor.

In Column 4, Lines 66-67, delete "subscibers" and insert -- subscribers --, therefor.

In Column 5, Line 1, delete "to The" and insert -- The --, therefor.

In Column 5, Line 16, delete "7 an" and insert -- 7 and --, therefor.

In Column 5, Line 18, delete "exchaning" and insert -- exchanging --, therefor.

In Column 5, Line 20, delete "controled" and insert -- controlled --, therefor.

In Column 5, Line 36, delete "trasceiver BT2 to the trasceiver" and insert -- transceiver BT2 to the transceiver --, therefor.

Signed and Sealed this
Twenty-third Day of October, 2012

David J. Kappos
*Director of the United States Patent and Trademark Office*

CERTIFICATE OF CORRECTION (continued)
U.S. Pat. No. 8,170,472 B2

In Column 6, Line 44, delete "telepone" and insert -- telephone --, therefor.

In Column 7, Line 11, delete "mobiletelephone" and insert -- mobile telephone --, therefor.

In Column 7, Line 21, delete "telepone" and insert -- telephone --, therefor.

In Column 7, Line 39, delete "of" and insert -- of the --, therefor.

In Column 8, Line 29, delete "telepone" and insert -- telephone --, therefor.

In Column 8, Line 46, delete "the the" and insert -- the --, therefor.

In Column 8, Line 60, delete "telphone" and insert -- telephone --, therefor.

In Column 9, Line 44, delete "trasceiver" and insert -- transceiver --, therefor.

In Column 10, Line 20, delete "audiable" and insert -- audible --, therefor.

In Column 11, Lines 52-53, delete "telepone" and insert -- telephone --, therefor.

In Column 12, Line 52, delete "inqury" and insert -- inquiry --, therefor.

In Column 13, Line 21, delete "keyes" and insert -- keys --, therefor.

In Column 13, Line 23, delete "keyes" and insert -- keys --, therefor.

In Column 13, Line 23, delete "mobil's" and insert -- mobile's --, therefor.

In Column 13, Line 24, delete "keyes" and insert -- keys --, therefor.

In Column 13, Line 27, delete "keyes" and insert -- keys --, therefor.

In Column 13, Line 28, delete "subsriber" and insert -- subscriber --, therefor.